United States Patent [19]

Weinhold

[11] 3,902,747
[45] Sept. 2, 1975

[54] COUPLING AND COUPLING SYSTEM FOR CONDUITS

[76] Inventor: Karl Weinhold, Im Jagdfeld 43, 404 Neub, Germany

[22] Filed: Mar. 4, 1974

[21] Appl. No.: 447,765

[30] Foreign Application Priority Data
Mar. 3, 1973 Germany............................ 2310680

[52] U.S. Cl.................................. 285/369; 285/419
[51] Int. Cl.².......................................... F16L 21/02
[58] Field of Search ........... 285/369, 373, 419, 112, 285/365, 243, 372

[56] References Cited
UNITED STATES PATENTS

| | | | |
|---|---|---|---|
| 2,041,316 | 5/1936 | Bennett........................... | 285/112 X |
| 2,120,184 | 6/1938 | Mojonnier...................... | 285/373 X |
| 2,512,999 | 6/1950 | Bruning.......................... | 285/112 X |
| 2,725,246 | 11/1955 | Weinhold........................ | 285/373 X |
| 3,116,078 | 12/1963 | Scherer........................... | 285/112 X |
| 3,396,993 | 8/1968 | Weinhold........................ | 285/243 X |

*Primary Examiner*—Thomas F. Callaghan
*Attorney, Agent, or Firm*—Sherman & Shalloway

[57] ABSTRACT

A coupling for hoses or pipes including a female coupling member having radial flanges formed by aligned pairs of chordal slots at each end thereof, and male conduit fittings having paired, chordal grooves alignable with the slots, opposed, U-shaped changes having flanges enterable through said slots into the grooves, a lock for securing the clamps in the slots and grooves, and a keying structure for preventing rotation of the lock and clamps with respect to the female coupling member. The system includes such male fittings on all conduits or components to be joined.

7 Claims, 5 Drawing Figures

COUPLING AND COUPLING SYSTEM FOR CONDUITS

BACKGROUND OF THE INVENTION

A variety of hose or conduit couplings have been tried, including double-socket connector sleeves for receiving insertable or plug type conduit fittings and double-plug connector members receivable in socket-type fittings on the ends of the conduits to be joined.

The lockings of such couplings against axial separation of the members has been tried in several ways. One of these locks includes the provision of radial flanges on the conduit fittings and the engagement of the radial flanges by separate locking members or by the side walls or flanges of C-clamps or U-shaped channels which span the length of the intermediate connector piece in order to engage the conduit fittings.

While such connectors and locks are acceptable in some circumstances, they are relatively large and heavy, since this type of connector is subject to a high degree of flexure of the channel clamps across the full span of the coupling.

Another form of prior coupling includes a conduit fitting in the form of a socket having radial slots on opposite sides. The cooperating, plug-type conduit fittings have annular grooves which are alignable with the slots in the socket connector. A transverse clamp or lock is then applied so that its spaced members protrude through the slots and into the groove in the conduit fitting to engage the fitting generally tangential to the bottom of the grooves.

However, this type of connection has the disadvantage that, like garden hoses, socket-to-socket connections of plug-to-plug connections cannot be made without special adapters. Where different points or different service and equipment is to be served, such mismatching of fittings often occurs unintentionally or unexpectedly. Therefore, it is preferable that the fittings, of the units to be joined, are standardized either as sockettype fittings or plug-type fittings.

In addition, this cumbersome type of transversely-applied, tangentially locked connector can be extremely difficult to disconnect, particularly if it has been fouled with dirt or debris. Further, it is almost impossible to disconnect this type of coupling, while the lines are still under pressure, without the use of tools. This extreme difficulty is not encountered in the flanged couplings having locking channels spanning the coupling flanges.

Furthermore, prior locking channels have been prone to the problem of rotation about the axis of the coupling body. Attempts have been made to secure these clamps, including special shapes, sleeves and abutments. However, additional weight is required by the use of relatively large locking means.

For the reason set forth above, among others, prior couplings have not been found to be completely satisfactory.

SUMMARY OF THE INVENTION

In general, the preferred form of coupling of the present invention includes a socket-type, double-ended coupling member having at each end a pair of transversely-opposed, radial slots, the conduit fittings being receivable in the coupling member and each having a pair of transversely-opposed grooves alignable with the slots of the coupling member, and a pair of channel members each having flanges enterable radially through one of the slits into the aligned groove, and means for securing the channel members in locking position.

The securing means for the channel members preferably includes a hinge between the members, a latch between the members opposite the hinge point, and means preventing rotation of the channel member assembly with respect to its coupling member.

OBJECTS OF THE INVENTION

Accordingly, it is an object of the invention to provide a compact and convenient coupling and locking member for conduits.

It is a further object of the present invention to provide a compact and secure coupling which is readily capable of being disconnected while under axial load.

A further object of the present invention is to provide a compact and secure coupling which is capable of joining two fittings with a single locking motion.

Another object of the present invention is to provide a compact and secure coupling having locking members which are not subject to subtantial, distorting stress.

A still further object of the invention is the provision of a compact and secure coupling having locking members which are subjected to a shear force instead of distortional flexing.

Another object of the invention is the provision of a compact and secure coupling having radial abutments formed by aligned, chordal recesses in the separable members and a locking member radially entering the recesses of separable members to the chordal plane to provide a shear lock between the separable members.

A further object of the invention is to provide a compact and secure coupling having chordal plane locking members which are mounted against rotation about the coupling member.

A further object of the invention is to provide a conduit system having standardized, similar fittings at the terminal ends of each component, and standardized coupling for joining two such fittings at each connection in the system.

BRIEF DESCRIPTION OF THE DRAWINGS

These and other objects of the invention, as well as a better understanding thereof, may be derived from the following description and the accompanying drawings, in which.

DETAILED DESCRIPTION OF THE PREFERRED EMBODIMENT

Figure 1:
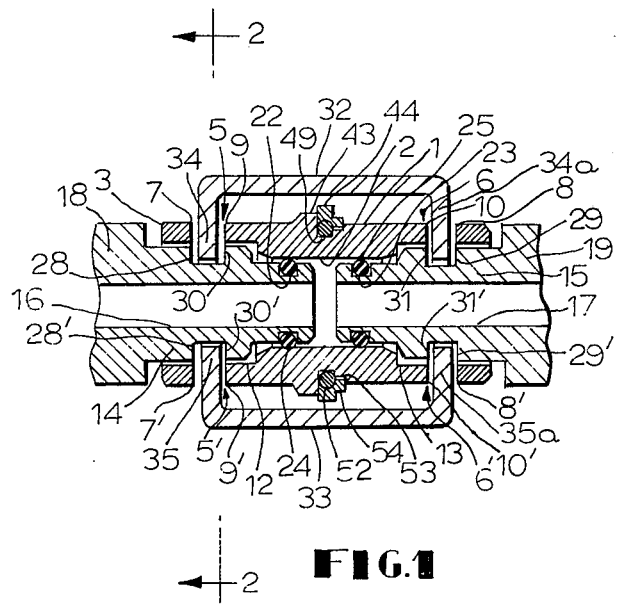
FIG. 1 is a sectional side view of the preferred form of coupling of the present invention.

As shown in the drawings, the preferred form of coupling of the present invention includes a coupling body 1 having a bore 2 therein and terminating in a pair of opposed, radial elements or flanges 3 and 4 at its opposite ends. The radial flanges 3 and 4 are formed by radially-aligned pairs of chordal, radially-directed, transverse slits 5, 5' and 6, 6', respectively, which provide outer abutment shoulders 7, 7' and 8, 8', respectively, and inner abutment shoulders, 9, 9' and 10, 10', respectively.

The bore 2 has opposite, enlarged portions 12 and 13, respectively, which are adjacent the flanges 3 and 4 and intersected by slits 5 and 6, respectively. The enlarged bores 12 and 13 loosely receive the cylindrical shanks 14 and 15 of fittings having bores 16 and 17, respectively, which are suitably mounted on the conduits or pipes 18 and 19 which are to be joined.

The fittings 14 and 15 each have a cylindrical extension 20 and 21, respectively, of sufficiently reduced diameter to enter the bore 2 easily but with a close fit. The extensions 20 and 21 each have a peripheral groove 22 and 23, respectively, for mounting O-rings 24 and 25, respectively, to form a fluidtight seal between the extensions 20, 21 and the bore 2.

The fittings 14 and 15 each have pairs of opposite chordal slots 26, 26' and 27, 27', respectively, which are radially directed to form abutments or outer shoulders 28, 28', and 29, 29', respectively, and inner shoulders 30, 30' and 31, 31', respectively.

Figure 2:
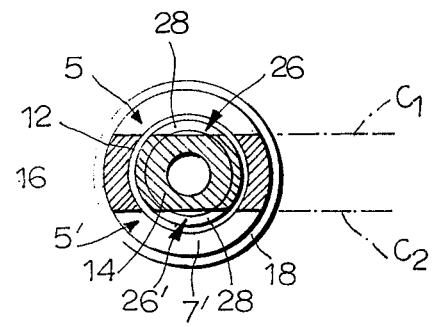
FIG. 2 is a cross-sectional view taken along lines 2—2 of FIG. 1.
Figure 3:
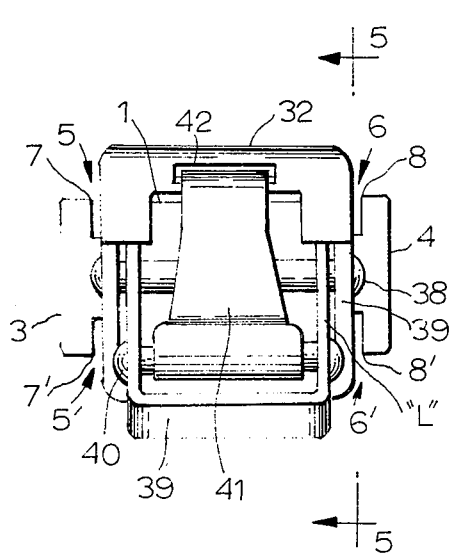
FIG. 3 is an external side view of the coupling of FIG. 1.

The width and radial depth of the slots 26, 26' and 27, 27' preferably substantially correspond to the width and radial depth of the slits 5, 5' and 6, 6' so that, when aligned, the bottoms of adjacent the grooves form substantially straight, parallel lines C1 and C2, as may best be seen in FIG. 2.

The coupling sleeve includes a surrounding clamp assembly including a pair of U-clamps or outwardly-curved channels 32 and 33 each of which has a pair of radially directed flanges of a thickness which freely fit into the slots and grooves, but with minimum "play." The radial flanges 34, 34a of the channel 32 are longitudinally aligned with the slot-groups [5–26] and [6–26] respectively, while the radial flanges 35, 35a of the channel 33 are similarly aligned with the slot-groups [5'–26'] and [6'–26'], respectively.

Figure 5:
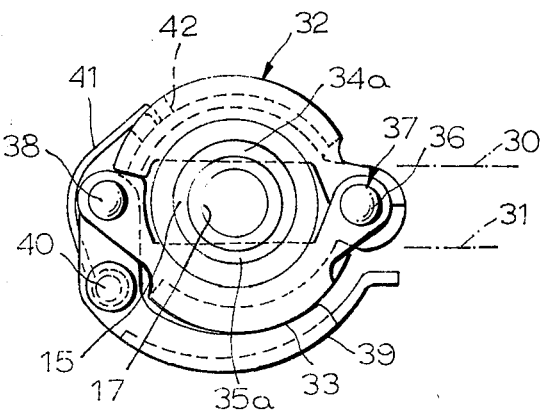
FIG. 5 is an end view of the coupling itself and taken along the lines 5—5 of FIG. 3.

The several flanges 34, 34a and 35, 35a terminate in straight edges E which, when in the locked position, shown in FIG. 5, substantially coincide with the parallel, chord lines C1 and C2, as best shown in FIG. 5.

The clamp channels 32 and 33 are rotatably hinged on a longitudinal pin or bolt 36 extended through aligned apertures 37 in their respective radial flanges. The bolt may be secured in the channels 32 and 33 by any suitable means such as threaded nuts or upset heads.

At its end remote from the bolt 36, the channel 33 carries a link pin 38 which, in its locked position, as shown in FIG. 5, is diametrically opposite the bolt 36 and may also be secured by any suitable means such as a threaded nut or upsetting of its ends.

Intermediate its engagement with the channel 33, the link pin carries a lock arm or toggle 39 which extends along the curvature of the channel 33. The toggle 39 mounts a toggle pin 40 at a position such that, when the toggle is closed as in FIG. 5, the toggle pin 40 is at or "over center" with regard to the link pin 38 and a perpendicular to the plane of the bolts 36 and 38, so that the assembly is locked. The toggle pin 40 carries a leaf spring 41 rotatably mounted thereon and which is extended outwardly around the link pin 38 to curve back toward and to relatively loosely engage a slot 42 in the channel 32.

The leaf spring 41 and the effective lever arm "L", which is inherent in the toggle 39 between the link pin 38 and the toggle pin 40, complete the articulation and circumferential closing of the locking assembly.

Figure 4:
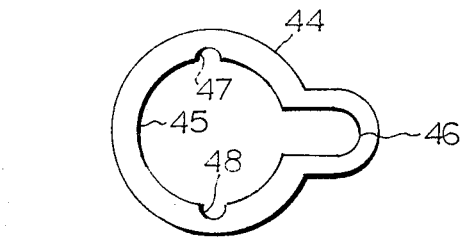
FIG. 4 is an axial view of the retainer element.

As best shown in FIG. 1, the coupling body 1 has an annular shoulder 43 near the mid-point of the body. A skeletal mounting loop 44 having a substantially circular inner edge 45 closely matching the exterior of the body 1 and a lateral extension 46 is seated against the annular shoulder 43. As best shown in FIG. 4, the loop 44 has semi-circular interruptions 47 and 48 diametrically opposite each other on a plane perpendicular to the axis A of the lateral extension 46.

The body 1 has diametrically-opposed ball seats 49 and 50, at the top and bottom of FIG. 1, respectively. A pair of keying balls 51 and 52 lock the loop 44 rotationally on the body 1. The balls 51 and 52 and the ring are secured on the body by a lock ring 53 which seats in an peripheral groove 54 in the body.

With the hinge pin 36 of the locking assembly passed through the lateral extension 46 of the loop 44, the locking assembly is both secured against rotation with respect to the body 1 and prevented from unintentional separation therefrom.

Thus it is apparent that the present invention provides a particularly convenient and secure coupling. Axial stresses are accomodated by abutment of opposite inner and outer shoulders of the joined members, with the interposed flanges being placed under a shear loading, instead of relying on heavy structural design to resist a flexing deformation.

When it is desired to break or disconnect the coupling, the toggle is rotated away from the locked position and with the force then exerted by the effective lever arm L and the spring 41 between the channels 32 and 33, the several radial flanges are positively levered out of locking engagement, permitting separation of the fittings 14 and 15 from the coupling body 1. Continued motion of the toggle, or a relief of stress on the leaf spring 41 permits the spring 41 to slip from the slot 42, thus permitting full removal of the radial flanges from their associated slots in the body 1. However, the mounting loop maintains the coupling unit in one piece, while maintaining rotational alignment between the body and the locking assembly.

Various changes may be made in the details of the invention, as disclosed, without sacrificing the advantages thereof or departing from the scope of the appended claims.

What is claimed is:
1. A coupling including
   a body having
      a bore therethrough,
      a pair of opposed radial slits in said body at each end thereof, said slits intersecting said bore along a chordal line,
   at least one conduit fitting, said conduit fitting having
      a pair of opposed chordal grooves on its outer surface, said chordal grooves being of a width substantially equal to the width of the slits in the body and of the depth to substantially align with the chordal line of the slits,
   a locking assembly including
      a pair of channel clamps positioned on opposite sides of said body and having
         radial flanges longitudinally spaced from each other to align with said slits, and bias means for selectively biasing said channel flanges radially through said slits into said grooves.

2. The coupling of claim 1 in which the locking assembly is secured on said body by radial mounting means.

3. The coupling of claim 2 in which said flanges each include a straight edge which is positioned along the chordal line of the slit and groove into which the flange is biased.

4. The coupling of claim 3 in which said radial mounting means includes means for securing the locking assembly against rotation with respect to said body and in the position at which said straight edges of said flanges align with said chordal lines.

5. The coupling of claim 4 in which said channels of said locking assembly are hinged on hinge means adjacent the radial mounting means and said biasing means includes a toggle assembly at the ends of said channels remote from said hinge means.

6. The coupling of claim 5 in which the toggle assembly is in releaseable engagement with one of said channels.

7. The coupling of claim 6 including sealing means for providing a fluid seal between said fitting and the bore of said body.

* * * * *